United States Patent
Barnes

(10) Patent No.: US 11,534,921 B2
(45) Date of Patent: Dec. 27, 2022

(54) END EFFECTOR ASSEMBLIES FOR DRILLING A PLURALITY OF SPACED-APART HOLES IN A PART, ROBOTS INCLUDING THE END EFFECTOR ASSEMBLIES, AND ASSOCIATED METHODS

(71) Applicant: The Boeing Company, Chicago, IL (US)

(72) Inventor: Charles Edward Barnes, Glen Mills, PA (US)

(73) Assignee: The Boeing Company, Chicago, IL (US)

( * ) Notice: Subject to any disclaimer, the term of this patent is extended or adjusted under 35 U.S.C. 154(b) by 290 days.

(21) Appl. No.: 16/808,253

(22) Filed: Mar. 3, 2020

(65) Prior Publication Data
US 2021/0276194 A1 Sep. 9, 2021

(51) Int. Cl.
*B25J 9/16* (2006.01)
*B25J 9/12* (2006.01)
*B25J 11/00* (2006.01)

(52) U.S. Cl.
CPC .............. *B25J 9/1679* (2013.01); *B25J 9/12* (2013.01); *B25J 9/1633* (2013.01); *B25J 11/0055* (2013.01)

(58) Field of Classification Search
CPC .. B23B 35/00; B25J 9/12; B25J 9/1633; B25J 9/1679; B25J 11/005; B25J 11/0055; Y10T 408/5623
See application file for complete search history.

(56) References Cited

U.S. PATENT DOCUMENTS

| | | | |
|---|---|---|---|
| 5,848,859 A * | 12/1998 | Clark | G05B 19/404 901/41 |
| 2008/0077276 A1* | 3/2008 | Montero Sanjuan | B62D 57/024 901/1 |
| 2011/0243676 A1* | 10/2011 | Marguet | B23B 39/00 408/72 R |
| 2013/0185925 A1* | 7/2013 | Sarh | B21J 15/105 29/283 |
| 2014/0115860 A1* | 5/2014 | Sarh | B23P 19/04 29/281.6 |

(Continued)

*Primary Examiner* — Dale Moyer
(74) *Attorney, Agent, or Firm* — Kolitch Romano Dascenzo Gates LLC

(57) ABSTRACT

End effector assemblies for drilling a plurality of spaced-apart holes in a part, robots including the end effector assemblies, and associated methods are disclosed herein. The end effector assemblies include a first force application structure, an end effector, and a second force application structure. The first force application structure is configured to apply a first force to a surface of the part. The end effector is configured to selectively transition the first force application structure between a retracted state and an extended state and to selectively extend a drill bit into the part and subsequently retract the drill bit from the part. The second force application structure is configured to continuously apply a second force to the surface of the part while the first force application structure is in the retracted state and as the end effector assembly transitions from a first predetermined location to a second predetermined location.

21 Claims, 8 Drawing Sheets

(56) References Cited

U.S. PATENT DOCUMENTS

| | | | |
|---|---|---|---|
| 2014/0115894 A1* | 5/2014 | Gamboa | B25B 11/00 269/21 |
| 2014/0216836 A1* | 8/2014 | Davies | B62D 55/06 180/164 |
| 2015/0003927 A1* | 1/2015 | Spishak | B23Q 9/0007 408/1 R |
| 2015/0226369 A1* | 8/2015 | Troy | F16M 11/42 901/1 |
| 2016/0207202 A1* | 7/2016 | Lee | G05B 19/40938 |

\* cited by examiner

END EFFECTOR ASSEMBLIES FOR DRILLING A PLURALITY OF SPACED-APART HOLES IN A PART, ROBOTS INCLUDING THE END EFFECTOR ASSEMBLIES, AND ASSOCIATED METHODS

FIELD

The present disclosure relates generally to end effector assemblies for drilling a plurality of spaced-apart holes in a part, to robots including the end effector assemblies, and/or to associated methods.

BACKGROUND

In certain manufacturing environments, such as aerospace applications, a part includes a skin that is attached to a frame by a plurality of fasteners. In order to accomplish this attachment, a plurality of spaced-apart holes is drilled through the skin and the frame and a corresponding fastener is positioned within each hole. It is beneficial to avoid a space and/or a gap between the skin and the frame, and it is challenging to avoid this space. This is especially true for large and/or complex parts, such as an aircraft fuselage. Conventionally, attachment of the skin of the fuselage to the frame of the fuselage is performed manually and is a labor-intensive and time-consuming process. It is desirable to automate the skin attachment process. Thus, there exists a need for end effector assemblies for drilling a plurality of spaced-apart holes in a part, for robots that include the end effector assemblies, and/or for associated methods.

SUMMARY

End effector assemblies for drilling a plurality of spaced-apart holes in a part, robots including the end effector assemblies, and associated methods are disclosed herein. The end effector assemblies include a first force application structure, an end effector, and a second force application structure. The first force application structure is configured to selectively and mechanically apply a first force to a surface of the part. The end effector is configured to selectively transition the first force application structure between a retracted state, in which the first force application structure is spaced-apart from the surface of the part, and an extended state, in which the first force application structure applies the first force to the surface of the part. The end effector also is configured to selectively extend a drill bit into the part and subsequently retract the drill bit from the part, while the first force application structure is in the extended state, to drill at least one spaced-apart hole of the plurality of spaced-apart holes. The second force application structure is configured to continuously apply a second force to the surface of the part while the first force application structure is in the retracted state and as the end effector assembly transitions, along the surface of the part, from a first predetermined location to a second predetermined location.

The robots include a robotic arm, a base structure, and the end effector assembly. The robotic arm extends between a first end and a second end. The base structure is operatively attached to the first end. The end effector assembly is operatively attached to the second end.

The methods include selectively applying a first force to a surface of the part at a first predetermined location and with a first force application structure of the end effector assembly. The methods also include selectively extending a drill bit of the end effector assembly into the part and subsequently retracting the drill bit assembly from the part. The selectively extending and subsequently retracting are performed while the first force is applied to the part. The methods further include ceasing application of the first force to the surface of the part after the drill bit is retracted from the part. The methods also include applying a second force to the surface of the part with a second force application structure of the end effector assembly. The methods further include transitioning the end effector assembly, along the surface of the part, from the first predetermined location to a second predetermined location. The transitioning is performed subsequent to the ceasing application of the first force and during the applying the second force.

DESCRIPTION

Figure 1:
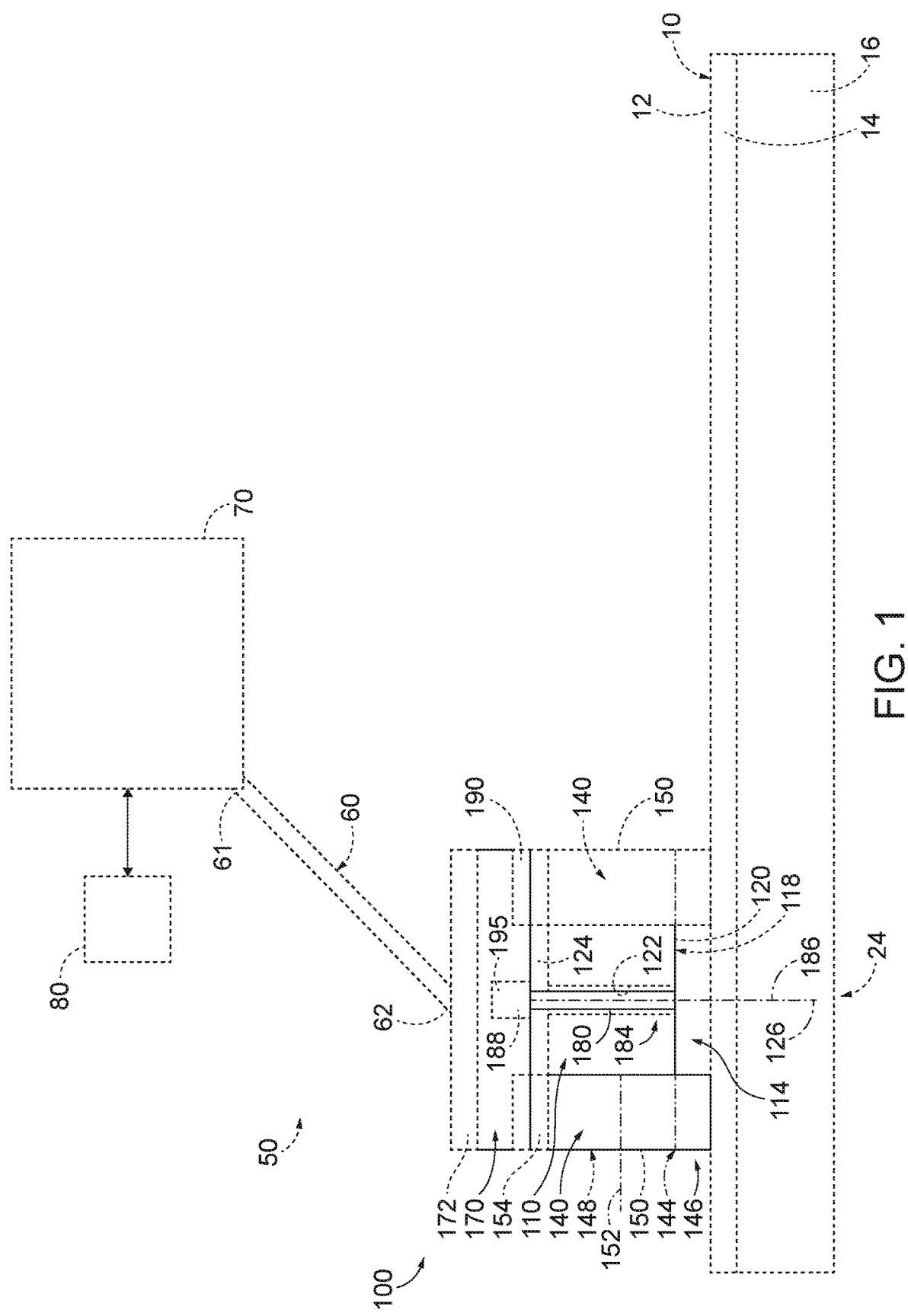
FIG. 1 is a schematic illustration of examples of end effector assemblies and/or of robots that include the end effector assemblies, according to the present disclosure, illustrating a first force application structure of the end effector assemblies in a retracted state prior to drilling at least one hole in a part and at a first predetermined location.

FIGS. 1-8 provide illustrative, non-exclusive examples of robots 50, of end effector assemblies 100, and/or of methods 200, according to the present disclosure. Elements that serve a similar, or at least substantially similar, purpose are labeled with like numbers in each of FIGS. 1-8, and these elements may not be discussed in detail herein with reference to each of FIGS. 1-8. Similarly, all elements may not be labeled in each of FIGS. 1-8, but reference numerals associated therewith may be utilized herein for consistency. Elements, components, and/or features that are discussed herein with reference to one or more of FIGS. 1-8 may be included in and/or utilized with any of FIGS. 1-8 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a particular embodiment without departing from the scope of the present disclosure.

FIGS. 1-7 are schematic illustrations of examples of end effector assemblies 100 and/or of robots 50 that include end effector assemblies 100, according to the present disclosure. As illustrated collectively by FIGS. 1-7 and discussed in more detail herein with reference to methods 200 of FIG. 8, end effector assemblies 100 and/or robots 50 are configured to drill a plurality of spaced-apart holes 20, which are illustrated in FIGS. 3-7, in a part 10. End effector assemblies 100 also are referred to herein as a nose cone and/or as a nosepiece for robots 50.

As illustrated in solid lines in FIGS. 1-7, end effector assemblies 100 include a first force application structure 110, a second force application structure 140, and an end effector 170. First force application structure 110 is configured to selectively and/or mechanically apply a first force to a surface 12 of part 10.

Figure 3:
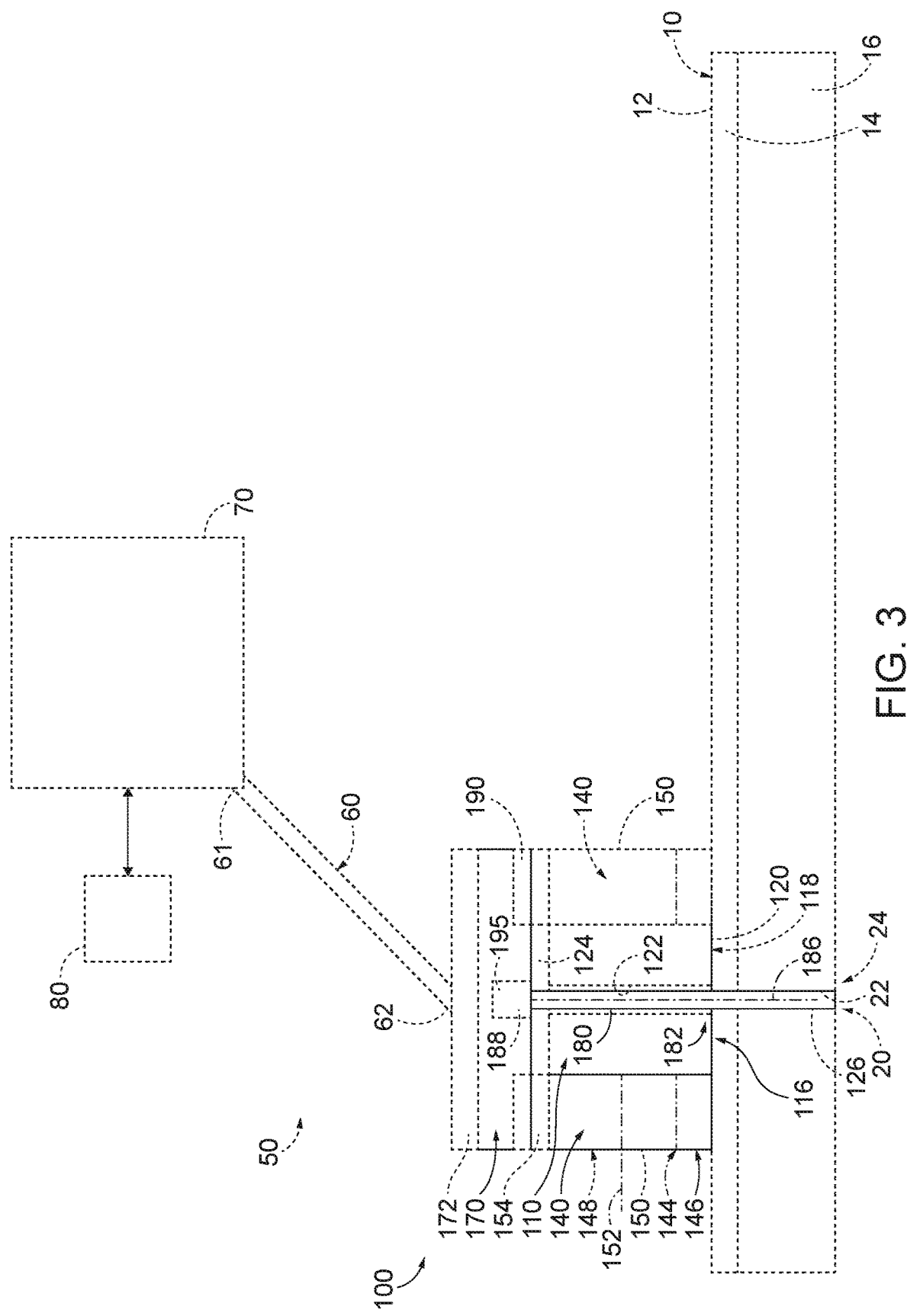
FIG. 3 is a schematic illustration of examples of the end effector assemblies and/or robots of FIGS. 1-2 illustrating a drill bit of the end effector assembly drilling the at least one hole in the part at the first predetermined location.
Figure 4:
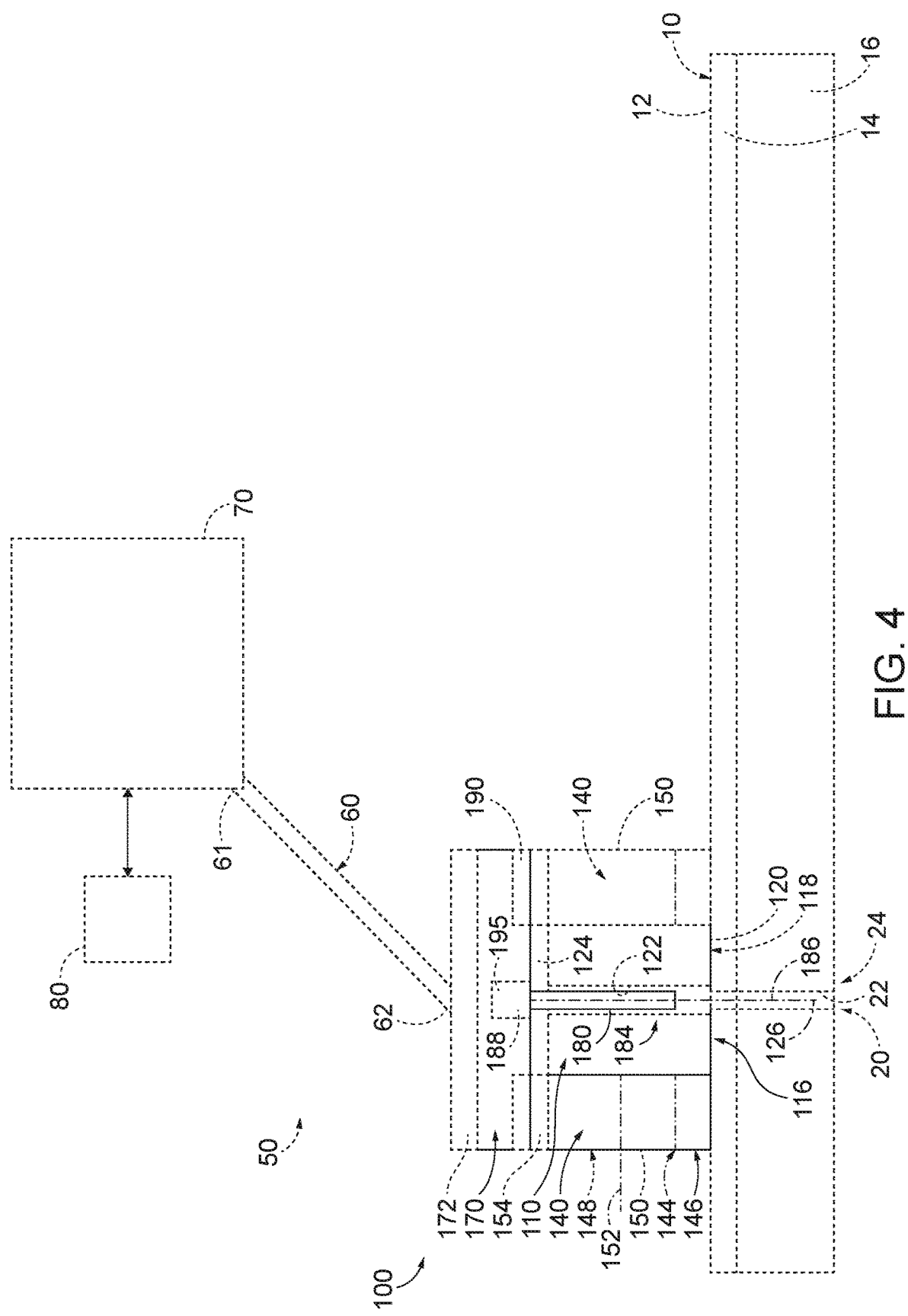
FIG. 4 is a schematic illustration of examples of the end effector assemblies and/or robots of FIGS. 1-3 after the at least one hole has been drilled in the part.
Figure 5:
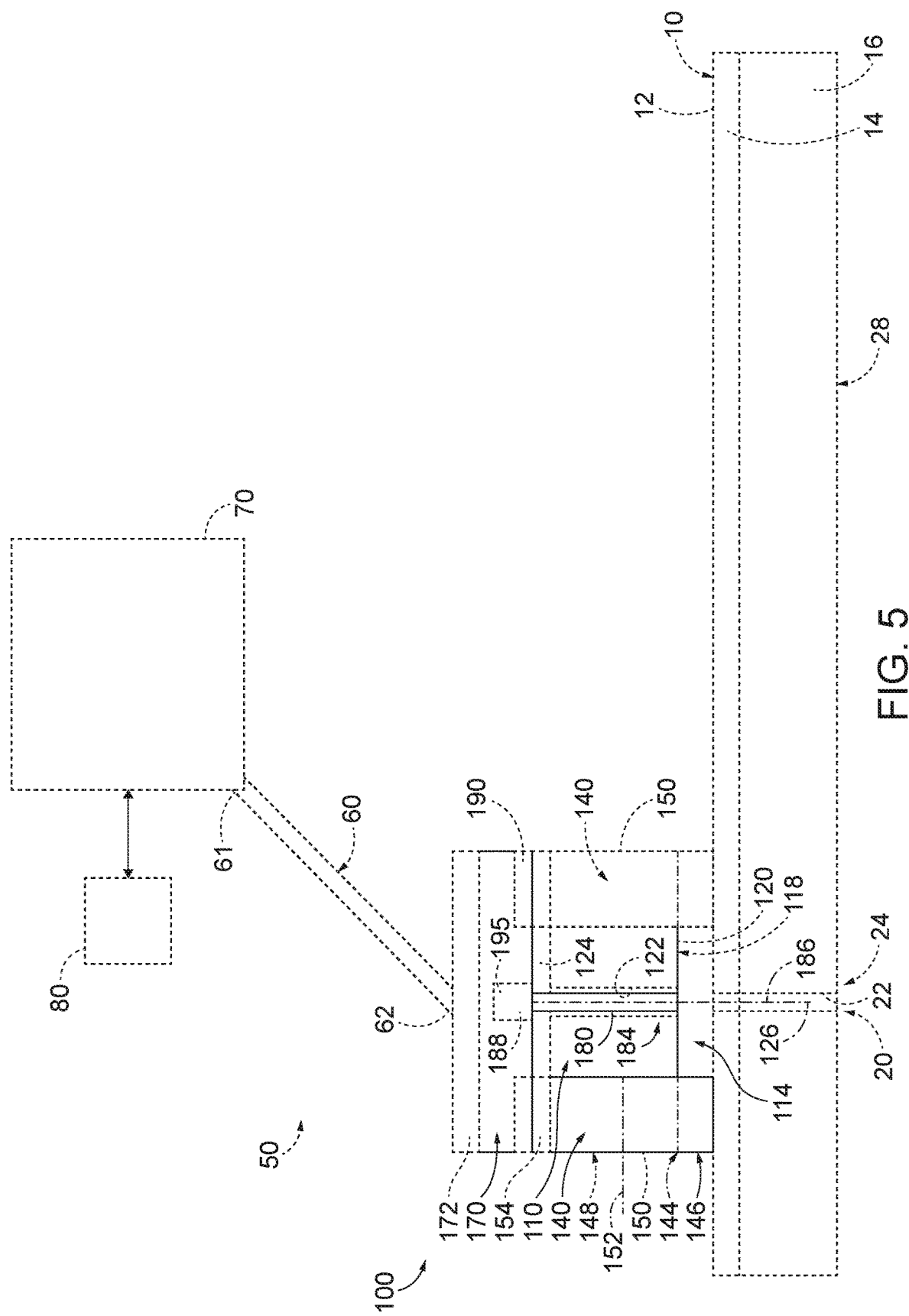
FIG. 5 is a schematic illustration of examples of the end effector assemblies and/or robots of FIGS. 1-4 upon returning the first force application structure to a retracted state.
Figure 6:
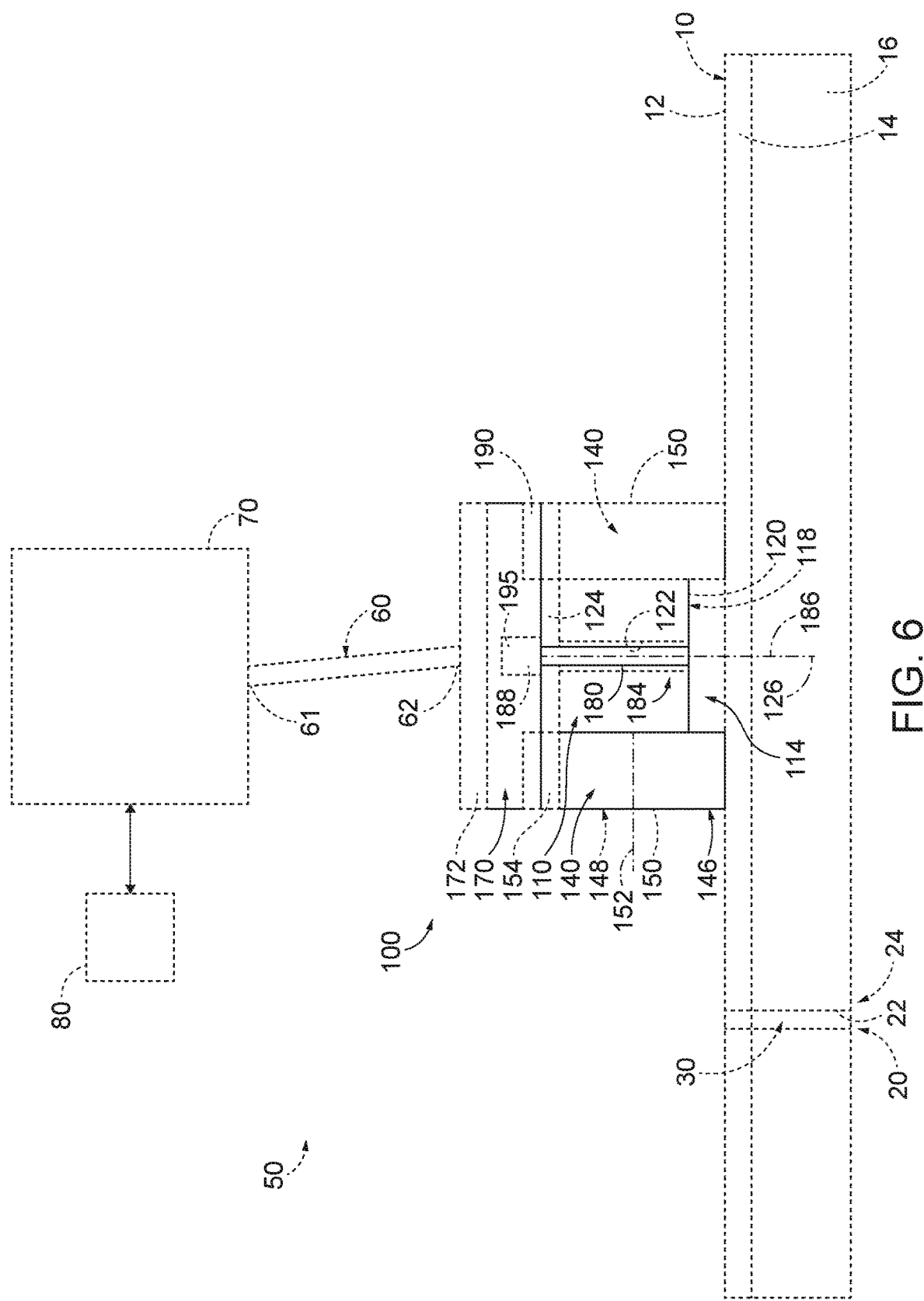
FIG. 6 is a schematic illustration of examples of the end effector assemblies and/or robots of FIGS. 1-5 applying a second force to the part with a second force application structure as the end effector transitions from the first predetermined location to a second predetermined location.

End effector 170 is configured to selectively transition first force application structure 110 between a retracted state 114, as illustrated in FIGS. 1 and 5-6, and an extended state 116, as illustrated in FIGS. 2-4 and 7. Retracted state 114 also is referred to herein as a relaxed state 114, and extended state 116 also is referred to herein as an engaged state 116. When first force application structure 110 is in retracted state 114, first force application structure 110 is spaced-apart from surface 12 of part 10 and/or does not apply the first force to surface 12 of part 10. When first force application structure 110 is in extended state 116, first force application structure is in contact with surface 12 of part 10 and/or applies, or mechanically applies, the first force to surface 12 of part 10.

Figure 7:
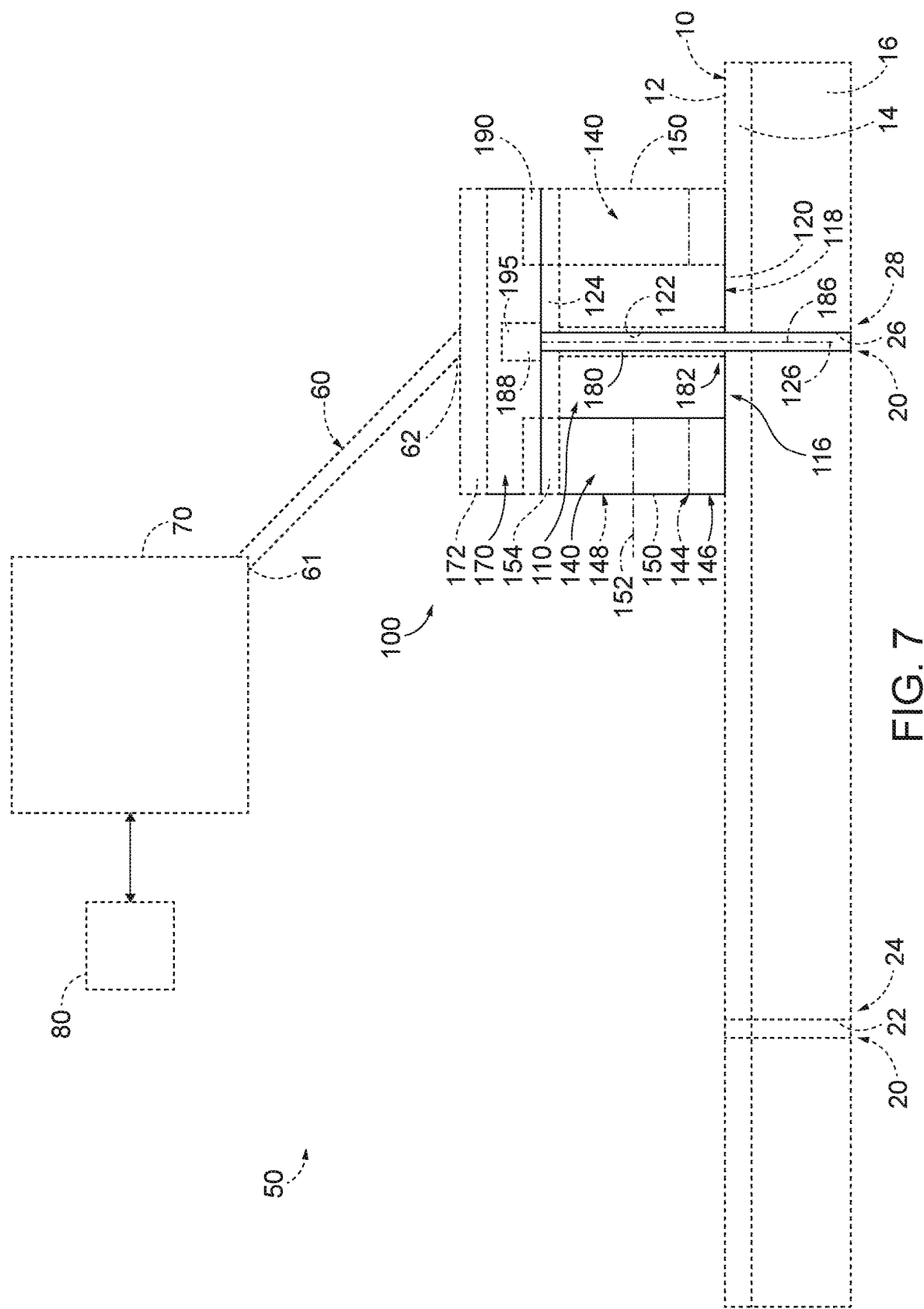
FIG. 7 is a schematic illustration of examples of the end effector assemblies and/or robots of FIGS. 1-6 illustrating the drill bit of the end effector assembly drilling a subsequent hole in the part at the second predetermined location.

End effector 170 also is configured to selectively extend a drill bit 180 into part 10, as illustrated in FIGS. 3 and 7, and subsequently to retract drill bit 180 from part 10, as illustrated in FIG. 4, to drill at least one spaced-apart hole 20 within part 10. End effector assembly 100 and/or end effector 170 thereof is configured such that drill bit 180 drills at least one spaced-apart hole 20 while first force application structure 110 is in extended state 116 and/or while first force application structure 110 applies the first force to surface 12 of part 10.

Second force application structure 140 is configured to continuously apply a second force to surface 12 of part 10 as end effector assembly 100 transitions, along surface 12 of part 10, from a first predetermined location 24 of a first hole 22 of the plurality of spaced-apart holes 20, as illustrated in FIG. 3, to a second predetermined location 28 of a second hole 26 of the plurality of spaced-apart holes 20, as illustrated in FIG. 7. This transition from first predetermined location 24 to second predetermined location 28 is illustrated by the transition illustrated sequentially by FIGS. 5, 6, and 7. As illustrated, and during the transition from first predetermined location 24 to second predetermined location 28, first force application structure 110 is in retracted state 114.

Figure 2:
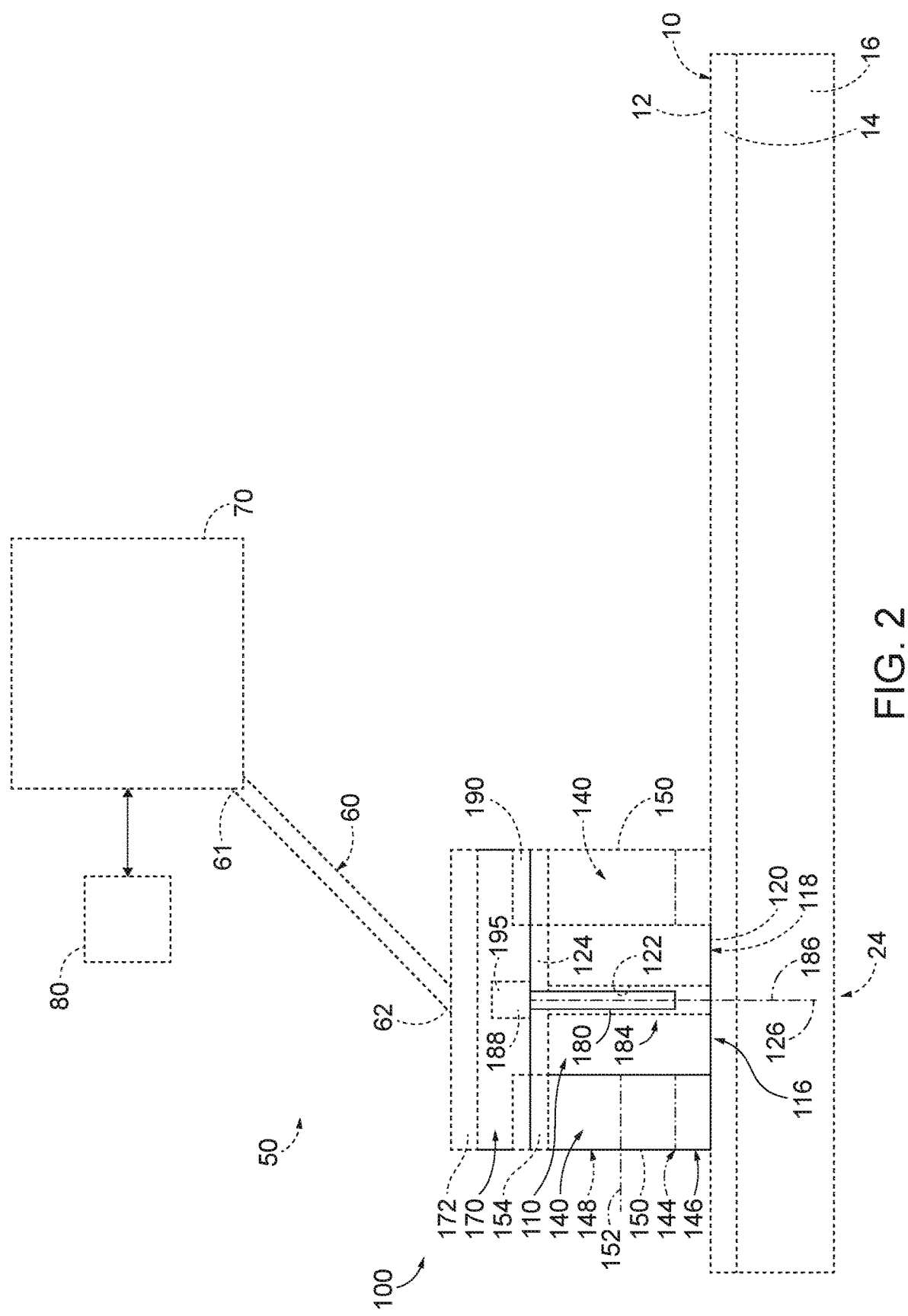
FIG. 2 is a schematic illustration of examples of the end effector assemblies and/or of robots of FIG. 1 illustrating the first force application structure in an extended state.
Figure 8:
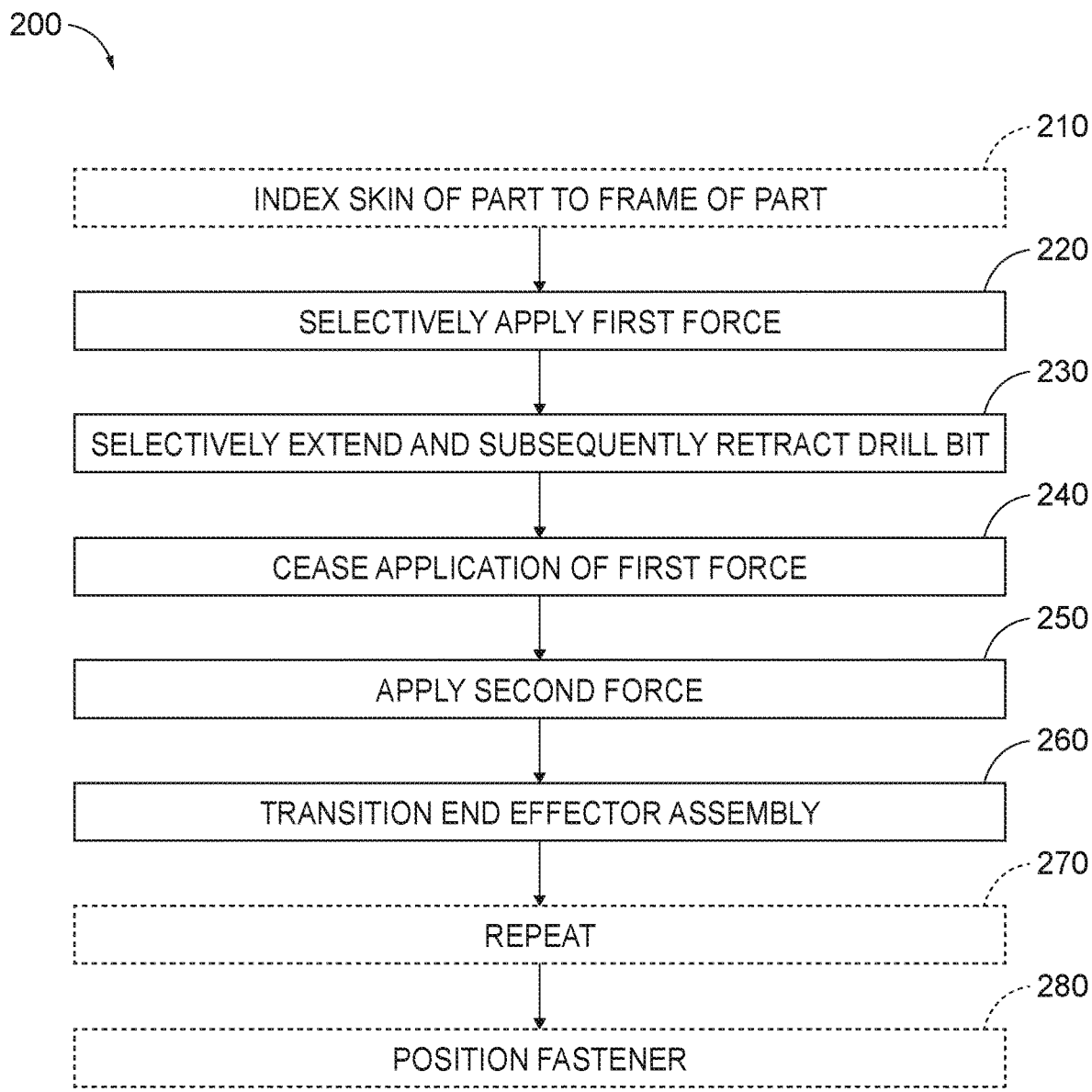
FIG. 8 is a flowchart depicting methods of utilizing an end effector assembly, according to the present disclosure, to drill a plurality of spaced apart-holes in a part.

During operation of end effector assemblies 100 and/or of robots 50 that include end effector assemblies 100, and as also discussed in more detail herein with reference to methods 200 of FIG. 8, end effector assemblies 100 are positioned at first predetermined location 24, as illustrated in FIG. 1. Subsequently, first force application structure 110 is transitioned from retracted state 114, as illustrated in FIG. 1, to extended state 116, as illustrated in FIG. 2, such that the first force application structure applies, or selectively applies, the first force to surface 12 of part 10. During application of the first force by first force application structure 110, and as illustrated in FIG. 3, drill bit 180 is extended into part 10 to drill first hole 22 in and/or within part 10. Drill bit 180 then is retracted from part 10, as illustrated in FIG. 4. Subsequently, and as illustrated in FIG. 5, first force application structure 110 is transitioned to retracted state 114 such that first force application structure 110 no longer applies the first force to surface 12 of part 10.

In addition to the above, second force application structure 140 is utilized to apply the second force to surface 12 of part 10. In some examples, and as discussed in more detail herein, second force application structure 140 selectively, or intermittently, applies the second force to surface 12 of part 10. In some examples, and as also discussed in more detail herein, second force application structure 140 continuously applies the second force to surface 12 of part 10 while end effector assemblies 100 are utilized to drill a plurality of spaced-apart holes 20 in part 10. In all examples, second force application structure 140 applies the second force to surface 12 of part 10 as end effector assemblies 100 are transitioned from first predetermined location 24 to second predetermined location 28, as sequentially illustrated by the transition from FIG. 5 to FIG. 6 to FIG. 7.

As discussed, some examples of part 10 include a skin 14 and a frame 16. In these examples, holes 20 are filled with fasteners 30, as illustrated in FIG. 6, to operatively attach skin 14 to frame 16. In such examples, application of the second force by second force application structure 140, during the transition from first predetermined location 24 to second predetermined location 28, decreases a potential for formation of a space and/or gap between skin 14 and frame 16, thereby permitting and/or facilitating automated, or at least partially automated, attachment of skin 14 to frame 16.

In various examples, first force application structure 110 includes any suitable structure that is adapted, configured, designed, and/or constructed to selectively and/or mechanically apply the first force to surface 12 of part 10. In some examples, first force application structure 110 includes a pressure foot 118. Pressure foot 118, when present, is configured to press against surface 12 of part 10 when first force application structure 110 is in extended state 116. In some such examples, pressure foot 118 includes a pressure foot surface 120 configured to press against surface 12 of part 10. In some such examples, pressure foot surface 120 is a planar, or an at least substantially planar, pressure foot surface 120. Such a configuration facilitates application of the first force to planar, or at least substantially planar, surfaces 12. In some such examples, pressure foot surface 120 is rigid, or at least substantially rigid. Such a configuration facilitates more direct application of the first force to surface 12. In some such examples, pressure foot surface 120 is resilient and/or flexible. Such a configuration permits pressure foot surface 120 to conform, or to at least partially conform, to surface 12 and/or decreases a potential for damage to and/or deformation of surface 12 during application of the first force.

In some examples, pressure foot surface 120 defines an aperture 122. In some such examples, drill bit 180 extends in, within, and/or through aperture 122 when end effector assembly 100 is utilized to drill hole 20. In some examples, pressure foot surface 120 is an annular pressure foot surface that surrounds aperture 122. Such a configuration permits and/or facilitates more uniform application of the first force around a region of surface 12 within which hole 20 will be drilled by drill bit 180.

In some examples, first force application structure 110 at least partially surrounds at least a threshold fraction of a transverse cross-section of drill bit 180. Stated another way, first force application structure 110 extends around at least the threshold fraction of the transverse cross-section of drill bit 180. Such a configuration similarly permits and/or facilitates more uniform application of the first force around a region of surface 12 within which hole 20 will be drilled by drill bit 180. Examples of the threshold fraction of the transverse cross-section of drill bit 180 include at least 50%, at least 60%, at least 70%, at least 80%, at least 90%, at least 95%, at least 99%, 100%, at most 100%, at most 99%, at most 95%, at most 90%, at most 80%, at most 70%, and/or at most 60%.

In some examples, and as illustrated in dashed lines in FIGS. 1-7, first force application structure 110 includes a first force regulating structure 124. First force regulating structure 124, when present, is configured to regulate, or to selectively regulate, the first force and/or a magnitude of the first force. An example of first force regulating structure 124 includes a first force transducer configured to selectively measure the magnitude of the first force. Another example of first force regulating structure 124 includes a first force regulating actuator configured to selectively adjust the first force. Examples of the first force regulating actuator include a first force regulating liner actuator, a first force regulating pneumatic actuator, a first force regulating hydraulic actuator, a first force regulating electrical actuator, a first force regulating mechanical actuator, a first force regulating rack and pinion assembly, and/or a first force regulating lead screw and nut assembly.

In some examples, first force regulating structure 124 includes a first feedback mechanism configured to measure, such as via the first force transducer, and regulate, such as via the first force regulating actuator, the magnitude of the first force. In some examples, first force regulating structure 124 is defined by, or at least partially defined by, end effector 170. In some examples, first force regulating structure 124 is separate, at least partially separate, distinct, and/or at least partially distinct from end effector 170.

In various examples, end effector 170 includes any suitable structure that is adapted, configured, designed, and/or constructed to selectively transition first force application structure 110 between retracted state 114 and extended state 116 and/or to selectively extend drill bit 180 into part 10 and subsequently retract drill bit 180 from part 10, such as to drill holes 20. As an example, end effector 170 may include an end effector actuator 172. End effector actuator 172, when present, is configured to selectively transition the first force application structure 110 between the retracted state 114 and the extended state 116, to selectively extend the drill bit 180 into part 10, and/or to subsequently retract drill bit 180 from part 10. Examples of end effector actuator 172 include an end effector liner actuator, an end effector pneumatic actuator, an end effector hydraulic actuator, an end effector electrical actuator, an end effector mechanical actuator, an end effector rack and pinion assembly, and/or an end effector lead screw and nut assembly.

In some examples, end effector 170 is configured to selectively transition first force application structure 110 between retracted state 114 and extended state 116 along a translation axis 126. In some such examples, end effector 170 also is configured to selectively and to subsequently retract drill bit 180 along a bit longitudinal axis 186. In some such examples, bit longitudinal axis 186 is parallel, or at least substantially parallel, to translation axis 126.

In various examples, second force application structure 140 includes any suitable structure that is adapted, configured, designed, and/or constructed to continuously apply the second force to surface 12 of part 10 while first force application structure 110 is in retracted state 114 and/or while end effector assembly 100 transitions, along surface 12 of part 10, from first predetermined location 24 to second predetermined location 28. In some examples, second force application structure 140 includes a rotation assembly 148 configured to roll along surface 12 of part 10 and also to apply the second force to surface 12 while end effector assembly 100 transitions from first predetermined location 24 to second predetermined location 28. Examples of rotation assembly 148 include a roller 150, a constant force roller 150, a pair of rollers 150, a pair of constant force rollers 150, and/or a pair of rollers 150 positioned on opposed sides of first force application structure 110. Examples of rollers 150 include a cylindrical roller and/or a spherical roller. Rollers 150, when present, may be configured to rotate about a roller axis 152. In some such examples, roller axis 152 is perpendicular, or at least substantially perpendicular, to bit longitudinal axis 186.

In some examples, second force application structure 140 includes a second force regulating structure 154. Second force regulating structure 154, when present, is configured to regulate, or to selectively regulate, the second force, or a magnitude of the second force, that is applied to surface 12 by second force application structure 140. An example of second force regulating structure 154 includes a second force transducer configured to selectively measure the magnitude of the second force. Another example of second force regulating structure 154 includes a second force regulating actuator configured to selectively adjust the second force. Examples of the second force regulating actuator include a second force regulating liner actuator, a second force regulating pneumatic actuator, a second force regulating hydraulic actuator, a second force regulating electrical actuator, a second force regulating mechanical actuator, a second force regulating rack and pinion assembly, and/or a second force regulating lead screw and nut assembly.

In some examples, second force regulating structure 154 includes a second feedback mechanism configured to measure, such as via the second force transducer, and regulate, such as via the second force regulating actuator, the magnitude of the second force. In some examples, second force regulating structure 154 is defined by, or at least partially defined by, end effector 170. In some examples, second force regulating structure 154 is separate, at least partially separate, distinct, and/or at least partially distinct from end effector 170.

In some examples, an orientation of second force application structure 140 relative to one or more other components of end effector assembly 100 is fixed, or at least substantially fixed. Stated another way, second force application structure 140 may always apply the second force to surface 12 of part 10 while end effector assembly 100 is utilized to drill holes 20 in part 10. Stated yet another way, second force application structure 140 may apply the second force both while first force application structure 110 is applying the first, while first force application structure 110 is in extended state 116, while first force application structure 110 is in retracted state 114, and/or while end effector assembly 100 transitions, along surface 12 of part 10, from first predetermined location 24 to second predetermined location 28.

In other examples, end effector assembly 100 and/or end effector 170 thereof is configured to transition, or to selectively transition, second force application structure 140 between a separated state 144, as illustrated in dash-dot lines in FIGS. 1-5 and 7, and a contacted state 146, as illustrated in solid lines in FIGS. 1-7. When in separated state 144, second force application structure 140 is spaced-apart from surface 12 of part 10 and/or does not apply the second force to surface 12. When in contacted state 146, second force application structure 140 contacts surface 12, physically contacts surface 12, and/or applies the second force to surface 12. Examples of structures of end effector 170 that may be utilized to transition second force application structure 140 between separated state 144 and contacted state 146 are disclosed herein with reference to end effector actuator 172.

In some examples, end effector assembly 100 is configured such that second force application structure 140 is removable and/or separable from a remainder of end effector assembly 100. Such a configuration permits and/or facilitates utilizing of the remainder of end effector assembly 100 in application in which second force application structure 140 is not needed and/or is not utilized. In some such examples, end effector assembly 100 includes a coupler 190. Coupler 190, when present, is configured to facilitate selective attachment of first force application structure 110 to the remainder of end effector assembly 100 and/or subsequent separation of first force application structure 110 from the remainder of end effector assembly 100. Examples of coupler 190 include a collar, a locking mechanism, a set screw, a threaded connection, and/or a clamp.

As discussed, end effector assembly 100 and/or end effector 170 thereof is configured to selectively extend drill bit 180 into part 10 and to selectively retract drill bit 180 from part 10 to drill the plurality of holes 20 within part 10. In some examples, end effector assembly 100 and/or end effector 170 thereof includes a drive structure 195. Drive structure 195, when present, is configured to selectively rotate drill bit 180 about bit longitudinal axis 186, such as to permit and/or to facilitate drilling of holes 20. Examples of drive structure 195 include any suitable motor, electric motor, hydraulic motor, and/or pneumatic motor.

In some examples, end effector assembly 100 and/or end effector 170 thereof includes a bit extension mechanism 188. Bit extension mechanism 188, when present, is configured to selectively transition drill bit 180 between a drill bit extended state 182, as illustrated in FIGS. 3 and 7, and a drill bit retracted state 184, as illustrated in FIGS. 1-2 and 4-6, such as to permit and/or facilitate drilling of holes 20 in part 10.

As discussed, and in some examples, end effector assembly 100 is utilized with, is included in, and/or forms a portion of a robot 50. Robot 50, when utilized, includes a robotic arm 60, a base structure 70, and an end effector assembly 100. Robotic arm 60 extends between a first end 61 and a second end 62. Base structure 70 is operatively attached to first end 61, and end effector assembly 100 is operatively attached to second end 62. In some examples, robotic arm 60 includes one or more arm joints, arm segments, and/or arm actuators that permit and/or facilitate positioning of end effector assembly 100 relative to base structure 70. Examples of base structure 70 include a fixed base, a mobile base, and/or a base configured to be mounted on part 10.

In some examples, robot 50 also includes a controller 80. Controller 80, when present, is programmed to control the operation of robot 50. In some examples, controller 80 is programmed to direct robot 50 to perform any suitable step and/or steps of methods 200, which are discussed in more detail herein. In some examples, controller 80 is programmed to position end effector assembly 100 at first predetermined location 24, as illustrated in FIGS. 1-5, to position end effector assembly 100 at second predetermined location 28, as illustrated in FIG. 7, and/or to transition, or to move, end effector assembly 100 from first predetermined location 24 to second predetermined location 28, as illustrated in FIG. 6.

In some examples, and while end effector assembly 100 is at first predetermined location 24, controller 80 is programmed to transition, or to selectively transition, first force application structure 110 from retracted state 114, as illustrated in FIGS. 1 and 5-6, to extended state 116, as illustrated in FIGS. 2-4 and 7, so that first force application structure 110 applies the first force to surface 12 of part 10. In some examples, and while the first force is applied to surface 12, controller 80 is programmed to selectively extend drill bit 180 into part 10, as illustrated in FIG. 3, and to subsequently retract drill bit 180 from part 10, as illustrated in FIG. 4, to drill at least one hole 20, such as first hole 22, in part 10. In some examples, and after the at least one hole has been drilled within part 10, controller 80 is programmed to transition first force application structure 110 from extended state 116 to retracted state 114, as illustrated by the transition from FIG. 4 to FIG. 5. In some examples, controller 80 is programmed to apply, or to direct second force application structure 140 to apply, the second force to surface 12, as illustrated at least in FIG. 5. In some examples, and during application of the second force to surface 12, controller 80 is programmed to transition end effector assembly 100 along surface 12 and from first predetermined location 24 to second predetermined location 28, as sequentially illustrated by the transition from FIG. 5 to FIG. 6 to FIG. 7.

FIG. 8 is a flowchart depicting methods 200 of utilizing an end effector assembly, according to the present disclosure, to drill a plurality of spaced-apart holes in a part. Examples of the end effector assembly are disclosed herein with reference to end effector assemblies 100 of FIGS. 1-7. In some examples, methods 200 include indexing a skin of the part to a frame of the part at 210. Methods 200 include selectively applying a first force at 220, selectively extending and subsequently retracting a drill bit at 230, and ceasing application of the first force at 240. Methods 200 also include applying a second force at 250 and transitioning the end effector assembly at 260. In some examples, methods 200 further include repeating at least a portion and/or subset of the methods at 270 and/or positioning a fastener at 280.

Indexing the skin of the part to the frame of the part at 210, when performed, includes indexing, or aligning, the skin of the part to the frame of the part in any suitable manner and is performed prior to the applying at 220. In some examples, the indexing at 210 includes aligning a skin reference hole of the skin, or even a single skin reference hole of the skin, with a frame reference hole of the frame, or even a single frame reference hole of the frame. In some such examples, the indexing at 210 includes positioning a fastener, or a temporary fastener, such that the temporary fastener extends through both the skin reference hole and the frame reference hole.

Selectively applying the first force at 220 includes selectively applying the first force with a first force application structure of the end effector assembly. Examples of the first force application structure are disclosed herein with reference to first force application structure 110 of FIGS. 1-7. The selectively applying the first force includes selectively applying the first force to a surface of the part and at a first predetermined location. In some examples, the first predetermined location is a first predetermined location of a first spaced-apart hole of the plurality of spaced-apart holes and/or a first predetermined location where the first spaced-apart hole will be drilled, such as during the selectively extending and subsequently retracting at 230.

In some examples, the selectively applying at 220 includes extending the first force application structure into contact with the surface of the part, such as by transitioning the first force application structure from a retracted state to an extended state. Examples of the retracted state and the extended state are disclosed herein with reference to retracted state 114 of FIGS. 1 and 5-6 and extended state 116 of FIGS. 2-4, respectively. Examples of structures that may be utilized to transition the first force application structure between the retracted state and the extended state are disclosed herein with reference to end effector 170 of FIGS. 1-7.

The applying at 220 may include applying the first force with any suitable first force magnitude. Examples of the first force magnitude include first force magnitudes of at least 200 Newtons (N), at least 250 N, at least 300 N, at least 350 N, at least 400 N, at least 450 N, at least 500 N, at most 800 N, at most 750 N, at most 700 N, at most 650 N, at most 600 N, at most 550 N, at most 500 N, at most 450 N, and/or at most 400 N. In some examples, the applying at 220 includes regulating, or selectively regulating, the first force magnitude to a desired first force magnitude, such as via first force regulating structure 124 of FIGS. 1-7.

In some examples, the applying at 220 includes applying the first force to the surface of the part with a pressure foot of the first force application structure. Examples of the pressure foot are disclosed herein with reference to pressure foot 118 of FIGS. 1-7. In some examples, the applying at 220 includes pressing the skin of the part against the frame of the part, such as to decrease, to decrease a potential for, and/or to eliminate a space and/or gap between the skin and the frame.

Selectively extending and subsequently retracting the drill bit at 230 includes selectively extending the drill bit of the end effector assembly into the part and subsequently retracting the drill bit of the end effector assembly from the part. The selectively extending and subsequently retracting at 230 includes selectively extending and subsequently retracting the drill bit to drill the first spaced-apart hole in the part. Examples of structures that may be utilized to perform the selectively extending and subsequently retracting at 230 are disclosed herein with reference to end effector 170 of FIGS. 1-7. When the part includes the skin and the frame, the selectively extending and subsequently retracting at 230 includes drilling the first spaced-apart hole in both the skin of the part and the frame of the part.

In some examples, the selectively extending and subsequently retracting at 230 includes rotating the drill bit about a bit longitudinal axis of the drill bit, such as to permit and/or facilitate drilling the hole in the part. In some examples, the extending the drill bit and/or the retracting the drill bit include extending and/or retracting along the bit longitudinal axis. In some examples, the extending the drill bit and the retracting the drill bit include extending and/or retracting utilizing the end effector of the end effector assembly.

In some examples, methods 200 and/or the end effector assembly utilized therein performs one or more other actions in addition to drilling the hole. In some such examples, the one or more additional actions include one or more of inspecting the hole and/or installing a fastener, or a temporary fastener, within the hole.

Ceasing application of the first force at 240 includes ceasing application of the first force to the part and is performed subsequent to the retracting the drill bit from the part. In some examples, the ceasing at 240 includes transitioning the first force application structure from the extended state to the retracted state. In some examples, the ceasing at 240 includes retracting the first force application structure from the surface of the part and/or establishing a spaced-apart relationship between the first force application structure and the surface of the part.

Applying the second force at 250 includes applying the second force to the surface of the part with a second force application structure of the end effector assembly. Examples of the second force application structure are disclosed herein with reference to second force application structure 140 of FIGS. 1-7. In some examples, the applying at 250 includes contacting the second force application structure with the surface of the part and/or applying the second force via contact between the second force application structure and the surface of the part.

The applying at 250 may include applying the second force with any suitable second force magnitude. Examples of the second force magnitude include second force magnitudes of at least 50 Newtons (N), at least 75 N, at least 100 N, at least 125 N, at least 150 N, at least 175 N, at least 200 N, at most 500 N, at most 400 N, at most 300 N, at most 275 N, at most 250 N, at most 225 N, and/or at most 200 N. Additional examples of the second force magnitude include second force magnitudes that are at least 15%, at least 20%, at least 25%, at least 30%, at least 35%, at most 50%, at most 45%, at most 40%, at most 35%, at most 30%, and/or at most 25% of the first force magnitude of the first force. In some examples, the applying at 250 includes regulating, or selectively regulating, the second force magnitude to a desired second force magnitude, such as via second force regulating structure 154 of FIGS. 1-7. When the part includes the skin and the frame, the applying at 250 includes pressing the skin against the frame.

The applying at 250 may be performed with any suitable timing and/or sequence during methods 200. In some examples, the applying at 250 includes applying the second force at least partially, or even completely, concurrently with the selectively applying at 220. In some examples, the applying at 250 includes applying the second force at least subsequent to the ceasing at 240. In some examples, the applying at 250 includes continuously applying the second force during the selectively applying at 220, during the selectively extending and subsequently retracting at 230, during the ceasing at 240, during the transitioning at 260, during the repeating at 270, and/or during the positioning at 280.

Transitioning the end effector assembly at 260 includes transitioning the end effector assembly along the surface of the part and from the first predetermined location to a second predetermined location. The transitioning at 260 is performed during the applying at 250 and/or subsequent to the ceasing at 240. As such, and when the part includes the skin and the frame, the applying at 250 during the transitioning at 260 decreases a potential for a space and/or a gap between the skin and the frame and/or presses the skin against the frame as the end effector assembly transitions from the first predetermined location to the second predetermined location. This may be accomplished by pressing the skin against the frame during the transitioning at 260.

In some examples, the transitioning at 260 includes moving the end effector assembly along a length of the frame and/or vertically upward and along the length of the frame. Such methods may further press the skin against the frame as the end effector moves along the length of the frame.

In some examples, the transitioning at 260 includes rolling a rotation assembly of the second force application structure along the surface of the part. Examples of the rotation assembly are disclosed herein with reference to rotation assembly 148 of FIGS. 1-7.

Repeating at least the portion and/or subset of the methods at 270, when performed, includes repeating any suitable step and/or steps of methods 200 in any suitable order. In some examples, the repeating at 270 includes repeating the selectively applying at 220, the selectively extending and subsequently retracting at 230, the ceasing at 240, the applying at 250, and/or the transitioning at 260 to drill the plurality of spaced-apart holes in the part.

Positioning the fastener at 280, when performed, includes positioning a given fastener within the first spaced-apart hole and may be performed subsequent to the retracting the drill bit from the part. In some examples, the positioning at 280 is performed after each hole of the plurality of holes is drilled in the part. Stated another way, in such examples, methods 200 include sequentially performing the selectively extending and subsequently retracting at 230 and then the positioning at 280 a plurality of times to locate a plurality of fasteners within the plurality of spaced-apart holes. In some examples, methods 200 include drilling the plurality of spaced-apart holes in the part prior to positioning a plurality of corresponding fasteners in the plurality of spaced-apart holes.

Illustrative, non-exclusive examples of inventive subject matter according to the present disclosure are described in the following enumerated paragraphs:

A1. An end effector assembly for drilling a plurality of spaced-apart holes in a part, the end effector assembly comprising:

a first force application structure configured to selectively and mechanically apply a first force to a surface of the part;

an end effector configured to:

(i) selectively transition the first force application structure between a retracted state, in which the first force application structure is spaced-apart from the surface of the part, and an extended state, in which the first force application structure applies the first force to the surface of the part; and (ii) selectively extend a drill bit into the part and subsequently retract the drill bit from the part, while the first force application structure is in the extended state, to drill at least one of the plurality of spaced-apart holes; and a second force application structure configured to continuously apply a second force to the surface of the part while the first force application structure is in the retracted state and as the end effector assembly transitions, along the surface of the part, from a first predetermined location to a second predetermined location.

A2. The end effector assembly of paragraph A1, wherein the first force application structure includes a pressure foot configured to press against the surface of the part when the first force application structure is in the extended state.

A3. The end effector assembly of paragraph A2, wherein the pressure foot includes a pressure foot surface configured to contact the surface of the part.

A4. The end effector assembly of paragraph A3, wherein the pressure foot surface is planar, or at least substantially planar.

A5. The end effector assembly of any of paragraphs A3-A4, wherein the pressure foot surface is at least substantially rigid.

A6. The end effector assembly of any of paragraphs A3-A5, wherein the pressure foot surface is resilient.

A7. The end effector assembly of any of paragraphs A3-A6, wherein the pressure foot surface defines an aperture, and further wherein the drill bit extends through the aperture when the end effector assembly drills the at least one of the plurality of spaced-apart holes.

A8. The end effector assembly of any of paragraphs A3-A7, wherein the pressure foot surface is an annular pressure foot surface.

A9. The end effector assembly of any of paragraphs A1-A8, wherein the first force application structure surrounds at least a threshold fraction of a transverse cross-section of the drill bit.

A10. The end effector assembly of paragraph A9, wherein the threshold fraction of the transverse cross-section of the drill bit includes at least one of:

(i) at least 50%, at least 60%, at least 70%, at least 80%, at least 90%, at least 95%, at least 99%, or 100%; and (ii) at most 100%, at most 99%, at most 95%, at most 90%, at most 80%, at most 70%, or at most 60%.

A11. The end effector assembly of any of paragraphs A1-A10, wherein the first force application structure includes a first force regulating structure configured to selectively regulate a magnitude of the first force.

A12. The end effector assembly of paragraph A11, wherein the first force regulating structure includes a first force transducer configured to measure the first force.

A13. The end effector assembly of any of paragraphs A11-A12, wherein the first force regulating structure includes a first force regulating actuator.

A14. The end effector assembly of any of paragraphs A11-A13, wherein the first force regulating structure includes a first feedback mechanism configured to measure and regulate the magnitude of the first force.

A15. The end effector assembly of any of paragraphs A11-A14, wherein the first force regulating structure is at least partially defined by the end effector.

A16. The end effector assembly of any of paragraphs A11-A15, wherein the first force regulating structure is distinct from the end effector.

A17. The end effector assembly of any of paragraphs A1-A16, wherein the end effector includes an end effector actuator configured to at least one of:

(i) selectively transition the first force application structure between the retracted state and the extended state; and (ii) selectively extend the drill bit into the part and subsequently retract the drill bit from the part.

A18. The end effector assembly of any of paragraphs A1-A17, wherein the end effector is configured to selectively transition the first force application structure between the retracted state and the extended state along a transition axis, and further wherein the end effector is configured to selectively extend the drill bit and subsequently retract the drill bit along a bit longitudinal axis that is parallel, or at least substantially parallel, to the transition axis.

A19. The end effector assembly of any of paragraphs A1-A18, wherein the second force application structure includes a rotation assembly configured to roll along the surface of the part and also to apply the second force to the surface of the part while the end effector assembly transitions from the first predetermined location to the second predetermined location.

A20. The end effector assembly of any of paragraphs A1-A19, wherein the second force application structure includes a pair of rollers positioned on opposed sides of the first force application structure, and further wherein the pair of rollers is configured to rotate about a roller axis that is perpendicular, or at least substantially perpendicular, to a/the bit longitudinal axis of the drill bit.

A21. The end effector assembly of any of paragraphs A1-A20, wherein the second force application structure includes a second force regulating structure configured to selectively regulate a magnitude of the second force.

A22. The end effector assembly of paragraph A21, wherein the second force regulating structure includes a second force transducer configured to measure the second force.

A23. The end effector assembly of any of paragraphs A21-A22, wherein the second force regulating structure includes a second feedback mechanism configured to measure and regulate the magnitude of the second force.

A24. The end effector assembly of any of paragraphs A21-A23, wherein the second force regulating structure is at least partially defined by the end effector.

A25. The end effector assembly of any of paragraphs A21-A24, wherein the second force regulating structure is distinct from the end effector.

A26. The end effector assembly of any of paragraphs A1-A25, wherein the end effector further is configured to selectively transition the second force application structure between a separated state, in which the second force application structure is spaced-apart from the surface of the part, and a contacted state, in which the second force application structure applies the second force to the surface of the part.

A27. The end effector assembly of any of paragraphs A1-A26, wherein the end effector assembly includes a coupler configured to facilitate selective attachment of the first force application structure to a remainder of the end effector assembly and subsequent separation of the first force application structure from the remainder of the end effector assembly.

A28. The end effector assembly of any of paragraphs A1-A27, wherein the end effector assembly further includes a drive structure configured to selectively rotate the drill bit about a/the bit longitudinal axis.

A29. The end effector assembly of any of paragraphs A1-A28, wherein the end effector assembly includes the drill bit.

(ii) B1. A robot, comprising:
a robotic arm extending between a first end and a second end;
a base structure operatively attached to the first end; and
the end effector assembly of any of paragraphs A1-A29 operatively attached to the second end.

B2. The robot of paragraph B1, wherein the robot further includes a controller programmed to control operation of the robot.

B3. The robot of paragraph B2, wherein the controller is programmed to direct the robot to perform the method of any of paragraphs C1-C25.

B4. The robot of any of paragraphs B2-B3, wherein the controller is programmed to:
(i) optionally position the end effector assembly at the first predetermined location;
(ii) while at the first predetermined location, selectively transition the first force application structure from the retracted state to the extended state to apply the first force to the surface of the part;
(iii) while the first force is applied to the surface of the part, selectively extend the drill bit into the part and subsequently retract the drill bit from the part to drill the at least one of the plurality of spaced-apart holes;
(iv) after the at least one of the plurality of spaced-apart holes is drilled, selectively transition the first force application structure from the extended state to the retracted state;
(v) apply the second force to the surface of the part with the second force application structure; and
(vi) during application of the second force to the surface of the part, transition the end effector assembly, along the surface of the part, from the first predetermined location to the second predetermined location.

C1. A method of utilizing an end effector assembly to drill a plurality of spaced-apart holes in a part, the method comprising:
selectively applying a first force, with a first force application structure of the end effector assembly, to a surface of the part at a first predetermined location optionally of a first spaced-apart hole of the plurality of spaced-apart holes;
during the selectively applying the first force, selectively extending a drill bit of the end effector assembly into the part and subsequently retracting the drill bit from the part to drill a first spaced-apart hole in the part;
subsequent to the retracting, ceasing application of the first force to the surface of the part;
applying a second force, with a second force application structure of the end effector assembly, to the surface of the part; and
during the applying the second force and subsequent to the ceasing application of the first force, transitioning the end effector assembly, along the surface of the part, from the first predetermined location to a second predetermined location optionally of a second spaced-apart hole of the plurality of spaced-apart holes.

C2. The method of paragraph C1, wherein the applying the first force includes extending the first force application structure into contact with the surface of the part.

C3. The method of any of paragraphs C1-C2, wherein the applying the first force includes at least one of:
(i) applying the first force with a first force magnitude of at least 200 Newtons (N), at least 250 N, at least 300 N, at least 350 N, at least 400 N, at least 450 N, or at least 500 N; and
(ii) applying the first force with the first force magnitude of at most 800 N, at most 750 N, at most 700 N, at most 650 N, at most 600 N, at most 550 N, at most 500 N, at most 450 N, or at most 400 N; and
(iii) selectively regulating the first force magnitude to a desired first force magnitude.

C4. The method of any of paragraphs C1-C3, wherein the applying the first force includes applying the first force with a pressure foot of the first force application structure.

C5. The method of any of paragraphs C1-C4, wherein the applying the first force includes pressing a skin of the part against a frame of the part, and further wherein the selectively extending and subsequently retracting includes drilling the first spaced-apart hole in both the skin of the part and the frame of the part.

C6. The method of any of paragraphs C1-05, wherein, during the extending the drill bit, the method further includes rotating the drill bit about a bit longitudinal axis of the drill bit.

C7. The method of any of paragraphs C1-C6, wherein the extending the drill bit includes at least one of:
(i) extending the drill bit along a/the bit longitudinal axis of the drill bit; and
(ii) extending the drill bit utilizing an end effector of the end effector assembly.

C8. The method of any of paragraphs C1-C7, wherein the retracting the drill bit includes at least one of:
(i) retracting the drill bit along a/the bit longitudinal axis of the drill bit; and
(ii) retracting the drill bit utilizing a/the end effector of the end effector assembly.

C9. The method of any of paragraphs C1-C8, wherein the ceasing application of the first force includes at least one of:
(i) retracting the first force application structure from the surface of the part; and
(ii) establishing a spaced-apart relationship between the first force application structure and the surface of the part.

C10. The method of any of paragraphs C1-C9, wherein the applying the second force includes applying the second force via contact between the second force application structure and the surface of the part.

C11. The method of any of paragraphs C1-C10, wherein the applying the second force includes at least one of:
(i) applying the second force with a second force magnitude of at least 50 Newtons (N), at least 75 N, at least 100 N, at least 125 N, at least 150 N, at least 175 N, or at least 200 N; and
(ii) applying the second force with the second force magnitude of at most 600 N, at most 500 N, at most 400 N, at most 300 N, at most 275 N, at most 250 N, at most 225 N, or at most 200 N;
(iii) applying the second force with the second force magnitude that is at least 15%, at least 20%, at least 25%, at least 30%, or at least 35% of a/the first force magnitude of the first force;
(iv) applying the second force with a second force magnitude that is at most 50%, at most 45%, at most 40%, at most 35%, at most 30%, or at most 25% of the first force magnitude of the first force; and
(v) selectively regulating the second force magnitude to a desired second force magnitude.

C12. The method of any of paragraphs C1-C11, wherein the applying the second force includes applying the second force with a rotation assembly of the second force application structure.

C13. The method of any of paragraphs C1-C12, wherein the applying the second force includes pressing a/the skin of the composite part against a/the frame of the composite part.

C14. The method of any of paragraphs C1-C13, wherein at least one of:
(i) the applying the second force includes applying the second force at least partially, or even completely, concurrently with the applying the first force;
(ii) the applying the second force includes applying the second force at least subsequent to the ceasing application of the first force; and
(iii) the applying the second force includes continuously applying the second force during the applying the first force, the selectively extending the drill bit, the subsequently retracting the drill bit, the ceasing application of the first force, and the transitioning the end effector assembly.

C15. The method of any of paragraphs C1-C14, wherein the transitioning includes rolling a/the rotation assembly of the second force application structure along the surface of the part.

C16. The method of any of paragraphs C1-C15, wherein the transitioning includes pressing a/the skin of the part against a/the frame of the part.

C17. The method of any of paragraphs C1-C16, wherein the transitioning includes moving the end effector assembly along a length of a/the frame of the part.

C18. The method of any of paragraphs C1-C17, wherein, prior to the selectively applying the first force, the method further includes indexing a/the skin of the part to a/the frame of the part.

C19. The method of paragraph C18, wherein the indexing includes aligning a skin reference hole, and optionally a single skin reference hole, of the skin with a frame reference hole, and optionally a single frame reference hole, of the frame.

C20. The method of paragraph C19, wherein the aligning further includes positioning a temporary fastener such that the temporary fastener extends through both the skin reference hole and the frame reference hole.

C21. The method of any of paragraphs C18-C20, wherein the transitioning the end effector assembly includes moving the end effector assembly vertically upward and along a length of the frame.

C22. The method of any of paragraphs C1-C21, wherein the method further includes repeating the selectively applying the first force, the selectively extending the drill bit, the subsequently retracting the drill bit, the ceasing application of the first force, the applying the second force, and the transitioning the end effector assembly a plurality of times to drill the plurality of spaced-apart holes in the part.

C23. The method of any of paragraphs C1-C22, wherein, subsequent to the subsequently retracting the drill bit from the part, the method further includes positioning a first fastener within the first spaced-apart hole.

C24. The method of any of paragraphs C1-C23, wherein the end effector assembly includes any suitable structure of any of the end effector assemblies of any of paragraphs A1-A29.

C25. The method of any of paragraphs C1-C24, wherein the method further includes performing the method utilizing the end effector assembly of any of paragraphs A1-A29.

D1. The use of a second force application structure to apply a second force to a surface of a part as an end effector assembly transitions, along the surface of the part, from a first predetermined location of a first spaced-apart hole of a plurality of holes to a second predetermined location of a second spaced-apart hole of the plurality of holes.

D2. The use of any of the end effector assemblies of any of paragraphs A1-A29 or any of the robots of any of paragraphs B1-B4 with any of the methods of any of paragraphs C1-C25.

D3. The use of any of the methods of any of paragraphs C1-C25 with any of the end effector assemblies of any of paragraphs A1-A29 or any of the robots of any of paragraphs B1-B4.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, A, B, and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, "at least substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

The invention claimed is:

1. An end effector assembly for drilling a plurality of spaced-apart holes in a part, the end effector assembly comprising:
   a first force application structure configured to selectively and mechanically apply a first force to a surface of the part;
   an end effector configured to:
   (i) selectively transition the first force application structure between a retracted state, in which the first force application structure is spaced-apart from the surface of the part, and an extended state, in which the first force application structure applies the first force to the surface of the part; and
   (ii) selectively extend a drill bit into the part and subsequently retract the drill bit from the part, while the first force application structure is in the extended state, to drill at least one of the plurality of spaced-apart holes; and
   a second force application structure configured to continuously apply a second force to the surface of the part while the first force application structure is in the retracted state and as the end effector assembly transitions, along the surface of the part, from a first predetermined location to a second predetermined location;
   wherein the first force application structure includes a pressure foot configured to press against the surface of the part when the first force application structure is in the extended state.

2. The end effector assembly of claim 1, wherein the pressure foot includes a pressure foot surface configured to contact the surface of the part.

3. The end effector assembly of claim 2, wherein the pressure foot surface defines an aperture, and further wherein the drill bit extends through the aperture when the end effector assembly drills the at least one of the plurality of spaced-apart holes.

4. The end effector assembly of claim 1, wherein the first force application structure surrounds at least 80% of a transverse cross-section of the drill bit.

5. The end effector assembly of claim 1, wherein the first force application structure includes a first force regulating structure configured to selectively regulate a magnitude of the first force.

6. The end effector assembly of claim 1, wherein the end effector includes an end effector actuator configured to at least one of:
   (i) selectively transition the first force application structure between the retracted state and the extended state; and (ii) selectively extend the drill bit into the part and subsequently retract the drill bit from the part.

7. The end effector assembly of claim 1, wherein the second force application structure includes a rotation assembly configured to roll along the surface of the part and also to apply the second force to the surface of the part while the end effector assembly transitions from the first predetermined location to the second predetermined location.

8. The end effector assembly of claim 1, wherein the second force application structure includes a pair of rollers positioned on opposed sides of the first force application structure, and further wherein the pair of rollers is configured to rotate about a roller axis that is perpendicular, or at least substantially perpendicular, to a bit longitudinal axis of the drill bit.

9. The end effector assembly of claim 1, wherein the second force application structure includes a second force regulating structure configured to selectively regulate a magnitude of the second force.

10. The end effector assembly of claim 1, wherein the end effector further is configured to selectively transition the second force application structure between a separated state, in which the second force application structure is spaced-apart from the surface of the part, and a contacted state, in which the second force application structure applies the second force to the surface of the part.

11. The end effector assembly of claim 1, wherein the end effector assembly includes a coupler configured to facilitate selective attachment of the first force application structure to a remainder of the end effector assembly and subsequent separation of the first force application structure from the remainder of the end effector assembly.

12. The end effector assembly of claim 1, wherein the end effector assembly further includes a drive structure configured to selectively rotate the drill bit about a bit longitudinal axis.

13. A robot, comprising:
a robotic arm extending between a first end and a second end;
a base structure operatively attached to the first end; and
the end effector assembly of claim 1 operatively attached to the second end.

14. The robot of claim 13, wherein the robot further includes a controller programmed to:
(i) position the end effector assembly at the first predetermined location;
(ii) while at the first predetermined location, selectively transition the first force application structure from the retracted state to the extended state to apply the first force to the surface of the part;
(iii) while the first force is applied to the surface of the part, selectively extend the drill bit into the part and subsequently retract the drill bit from the part to drill the at least one of the plurality of spaced-apart holes;
(iv) after the at least one of the plurality of spaced-apart holes is drilled, selectively transition the first force application structure from the extended state to the retracted state;
(v) apply the second force to the surface of the part with the second force application structure; and
(vi) during application of the second force to the surface of the part, transition the end effector assembly, along the surface of the part, from the first predetermined location to the second predetermined location.

15. A method of utilizing an end effector assembly to drill a plurality of spaced-apart holes in a part, the method comprising:

selectively applying a first force, with a first force application structure of the end effector assembly, to a surface of the part at a first predetermined location, wherein the selectively applying the first force includes selectively transitioning the first force application structure from a retracted state, in which the first force application structure is spaced-apart from the surface of the part, to an extended state, in which the first force application structure applies the first force to the surface of the part, and further wherein the selectively applying the first force includes pressing a skin of the part against a frame of the part;

during the selectively applying the first force, selectively extending a drill bit of the end effector assembly into the part and subsequently retracting the drill bit from the part to drill a first spaced-apart hole in the part, wherein the selectively extending and the subsequently retracting include drilling the first spaced-apart hole in both the skin of the part and the frame of the part;

subsequent to the retracting, ceasing application of the first force to the surface of the part;

applying a second force, with a second force application structure of the end effector assembly, to the surface of the part; and during the applying the second force and subsequent to the ceasing application of the first force, transitioning the end effector assembly, along the surface of the part, from the first predetermined location to a second predetermined location.

16. The method of claim 15, wherein the applying the second force includes applying the second force with a rotation assembly of the second force application structure.

17. The method of claim 15, wherein the applying the second force includes pressing the skin of the part against the frame of the part.

18. The method of claim 15, wherein the method further includes repeating the selectively applying the first force, the selectively extending the drill bit, the subsequently retracting the drill bit, the ceasing application of the first force, the applying the second force, and the transitioning the end effector assembly a plurality of times to drill the plurality of spaced-apart holes in the part.

19. An end effector assembly for drilling a plurality of spaced-apart holes in a part, the end effector assembly comprising:
a first force application structure configured to selectively and mechanically apply a first force to a surface of the part;
an end effector configured to:
(i) selectively transition the first force application structure between a retracted state, in which the first force application structure is spaced-apart from the surface of the part, and an extended state, in which the first force application structure applies the first force to the surface of the part; and
(ii) selectively extend a drill bit into the part and subsequently retract the drill bit from the part, while the first force application structure is in the extended state, to drill at least one of the plurality of spaced-apart holes; and
a second force application structure configured to continuously apply a second force to the surface of the part while the first force application structure is in the retracted state and as the end effector assembly transitions, along the surface of the part, from a first predetermined location to a second predetermined location;

wherein the end effector further is configured to selectively transition the second force application structure between a separated state, in which the second force application structure is spaced-apart from the surface of the part, and a contacted state, in which the second force application structure applies the second force to the surface of the part.

20. An end effector assembly for drilling a plurality of spaced-apart holes in a part, the end effector assembly comprising:
   a first force application structure configured to selectively and mechanically apply a first force to a surface of the part;
   an end effector configured to:
   (i) selectively transition the first force application structure between a retracted state, in which the first force application structure is spaced-apart from the surface of the part, and an extended state, in which the first force application structure applies the first force to the surface of the part; and
   (ii) selectively extend a drill bit into the part and subsequently retract the drill bit from the part, while the first force application structure is in the extended state, to drill at least one of the plurality of spaced-apart holes;
   a second force application structure configured to continuously apply a second force to the surface of the part while the first force application structure is in the retracted state and as the end effector assembly transitions, along the surface of the part, from a first predetermined location to a second predetermined location; and
   a coupler configured to facilitate selective attachment of the first force application structure to a remainder of the end effector assembly and subsequent separation of the first force application structure from the remainder of the end effector assembly.

21. A robot, comprising:
   a robotic arm extending between a first end and a second end;
   a base structure operatively attached to the first end;
   an end effector assembly for drilling a plurality of spaced-apart holes in a part operatively attached to the second end, wherein the end effector assembly includes:
   (i) a first force application structure configured to selectively and mechanically apply a first force to a surface of the part;
   (ii) an end effector configured to:
      (a) selectively transition the first force application structure between a retracted state, in which the first force application structure is spaced-apart from the surface of the part, and an extended state, in which the first force application structure applies the first force to the surface of the part; and
      (b) selectively extend a drill bit into the part and subsequently retract the drill bit from the part, while the first force application structure is in the extended state, to drill at least one of the plurality of spaced-apart holes; and
   (iii) a second force application structure configured to continuously apply a second force to the surface of the part while the first force application structure is in the retracted state and as the end effector assembly transitions, along the surface of the part, from a first predetermined location to a second predetermined location; and
   a controller programmed to:
   (i) position the end effector assembly at the first predetermined location;
   (ii) while at the first predetermined location, selectively transition the first force application structure from the retracted state to the extended state to apply the first force to the surface of the part;
   (iii) while the first force is applied to the surface of the part, selectively extend the drill bit into the part and subsequently retract the drill bit from the part to drill the at least one of the plurality of spaced-apart holes;
   (iv) after the at least one of the plurality of spaced-apart holes is drilled, selectively transition the first force application structure from the extended state to the retracted state;
   (v) apply the second force to the surface of the part with the second force application structure; and
   (vi) during application of the second force to the surface of the part, transition the end effector assembly, along the surface of the part, from the first predetermined location to the second predetermined location.

* * * * *